Oct. 19, 1926.
J. D. DURANT
1,603,525
MOTOR HEAT GAUGE
Filed March 30, 1926
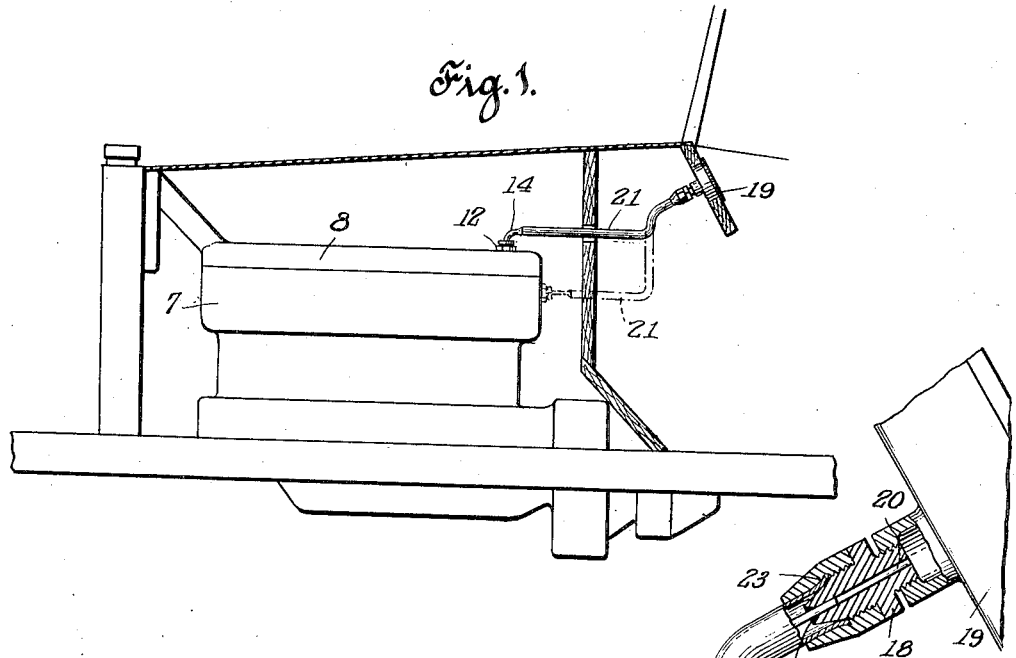
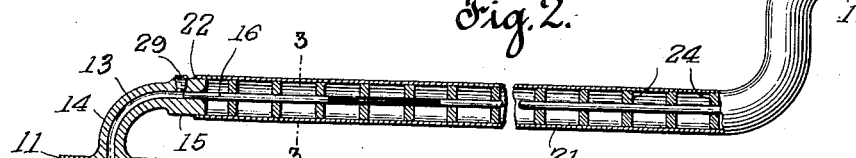
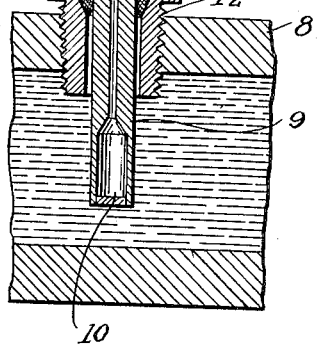
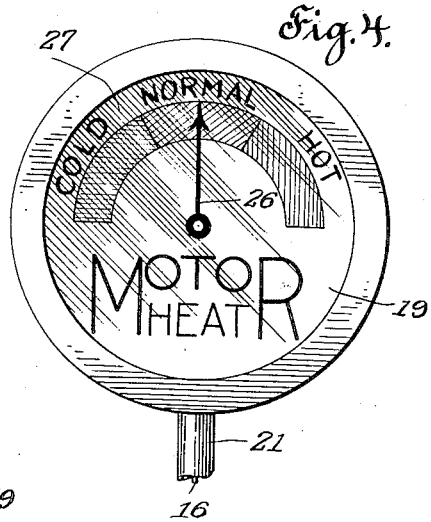
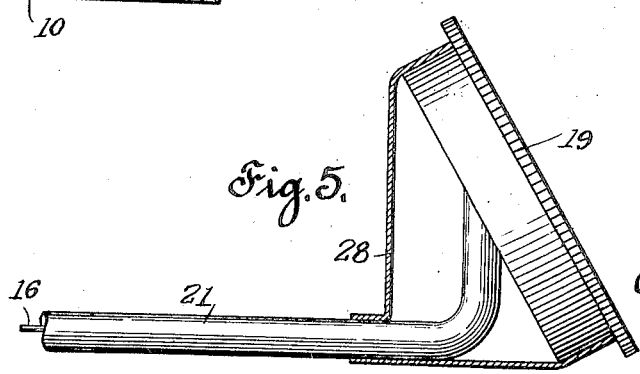
INVENTOR
John D. Durant
BY
Philip S. McLean
ATTORNEY Patented Oct. 19, 1926.

1,603,525

UNITED STATES PATENT OFFICE.

JOHN D. DURANT, OF NEW YORK, N. Y., ASSIGNOR, BY MESNE ASSIGNMENTS, TO BLUE RIBBON SALES AGENCY, INC., OF NEW YORK, N. Y., A CORPORATION OF NEW YORK.

MOTOR-HEAT GAUGE.

Application filed March 30, 1926. Serial No. 98,574.

This invention relates to gauges for indicating the temperature of internal combustion engines, particularly as used in automobiles.

It has been proposed to provide a direct reading instrument located on the dash or instrument panel of the car and to actuate this from a temperature responsive device entered in the water circulating system of the motor by a fluid connection extending from the motor to the instrument on the dash. These devices are more or less inaccurate because of the effect which varying temperatures have on the fluid connection extending from the temperature responsive device to the gauge. The variable thus introduced increases with the length of connection from motor to gauge and naturally fluctuates with such conditions as motor heat, effectiveness of the cooling fan, the exposure of the connection to motor heat, external temperature, etc.

Special objects of this invention are to overcome and eliminate the inaccuracies and disadvantages mentioned and to provide a simple, practical dash form of motor heat gauge which will show accurately the motor conditions unaffected by local or surrounding temperature conditions.

Further special objects are to provide the complete gauge in simple, inexpensive form easily assembled and applied to existing structures and to render it possible to easily adjust the gauge to properly show the engine temperature.

Various other objects and the special novel features of the invention which make possible the attainment of the same, will appear as the specification proceeds.

The drawing accompanying and forming part of this specification illustrates the invention embodied in a simple, practical form but inasmuch as the same is primarily for illustrative purposes, it will be understood that the structure may be modified in various respects without departure from the broad spirit and scope of the invention as hereinafter defined and claimed.

Figure 1 is a broken part sectional view illustrating the adaptation and mounting of the invention in an ordinary motor car.

Figure 2 is an enlarged broken sectional view of the complete device.

Figure 3 is a further enlarged cross sectional view of the pressure transmission connection as taken on the plane of line 3—3 of Figure 2.

Figure 4 is a face view of a suitable form of gauge or indicator.

Figure 5 is a part sectional view illustrating a form of enclosure for the instrument.

In the present disclosure, the expansibility of air under temperature conditions is utilized for the transmission of indications from the motor to the gauge proper. For the purpose, a small body of confined air is subjected to the motor heat and this confined body is connected by a very fine conduit with the indicating instrument on the dash.

In the illustration, a water cooled motor is indicated having a cooling jacket 7 which extends up into the removable head 8 of the engine. The temperature of the engine is taken from the water in this cooling jacket by inserting a plug therein carrying a confined air chamber. This plug is designated 9 in Figure 2 and is shown as having a sealed air chamber 10 in the lower end of the same entered within the body of cooling liquid. The plug is shown held by a packing gland 11 in a bushing 12 which seats in a screw opening in the wall of the water jacket.

From the expansion chamber 10, a small passage 13 extends up through the plug and through the protruding neck portion 14 which may be angled over or bent in various directions to suit requirements. The protruding neck of the plug terminates in a head 15 formed as a seat for one end of the fine bore tube 16. The other or upper end of this tube is shown soldered at 17 into a fitting 18 which is connected with the gauge 19 and has a bore 20 for transmitting pressure to the diaphragm or movable element of the gauge.

Surrounding the transmission tube 16 is a thermal insulating sheath shown as an outer metallic tube 21, exhausted and sealed at its opposite ends at 22 and 23 to the thermal plug and the fitting 18 respectively. The creation of a vacuum or partial vacuum surrounding the transmission tube practically prevents said tube from being influenced by local temperature conditions.

To prevent contact between the transmission tube and envelope, spacing means such as the thermal insulating washers 24 may be interposed between these two or other spacing means such as asbestos tubing or packing may be interposed between the two. This packing or spacing means should be of such a nature to permit of the enclosing sheath being properly exhausted.

To reduce to the smallest possible amount the quantity of air within the transmission line, a partial filler such as the wire 25 may be entered in the tubing 16.

The thermal insulating envelope about the pressure transmission tube protects the latter from variable temperature conditions and enables the indicating instrument to show at all times the true condition of the motor. The positive spacing of the sheath prevents contact between the tube and its envelope and this structure also permits of the tube and its envelope being bent to suit requirements without risk of bringing one into contact with the other.

In Figure 1, the thermal plug is shown in full lines entered in the head of the motor but in this same view, broken lines have been used to indicate that this plug may be entered as well in the main body of the water jacket where it will not interfere with the removal of the head of the engine.

The employment of air as a transmission medium enables the use of a pressure gauge, of substantially standard construction as a dash instrument. Thus the indicator shown may be of the usual diaphragm or Bourdon tube type arranged to actuate an indicating needle 26. The scale of this gauge is shown as calibrated as at 27 to indicate cold, normal and hot conditions at the engine.

The thermal insulating envelope about the transmission line may be continued as indicated at 28 in Figure 5 to thermally insulate the indicating gauge as well as the transmission line but this usually is not necessary, since the protection of the relatively long connection between plug and indicator is usually sufficient to avoid fluctuation which otherwise would arise from varying temperature conditions about the motor or in the air in and about the car.

To enable the indicator being readily adjusted, a vent screw is shown at 29 in Figure 2 entered in the head 15 of the plug. Opening this screw releases the pressure in the transmission line so that if the indicating pointer travels off the scale it can be brought back into proper position on the scale by releasing some of the air in the system. On the other hand, if the indicator underregisters, the screw may be released when the system is cold so as to trap fresh air. If too much air is admitted this can be released, as in the first instance, to bring the pointer into proper position on the scale. This screw thus provides a simple means by which the system can be "locked up" under any desired temperature conditions.

The filler in the fine bore transmission tube reduces the quantity of air in this line to a minimum and this, with the thermal insulation, practically avoids all errors and fluctuations of indication.

What is claimed is:

1. The combination with an inclosing chamber, a suitable indicating instrument located at a distance therefrom and a transmission conduit extending from said chamber to said instrument, of an envelope sealed in spaced relation about said conduit and protecting said transmission conduit from local temperature conditions intervening between the chamber and the indicating instrument, said conduit serving to confine a pressure column extending from the chamber to the instrument and means accessible while the system is in operation to seal said pressure column under different atmospheric conditions.

2. In combination, a sealed pressure expansion chamber, a suitably calibrated pressure actuated indicating device, a pressure conduit extending from the chamber to said indicating device and means associated with said conduit and accessible while the system is in operation to unseal and reseal the pressure chamber at any time to existing atmospheric conditions, said pressure chamber having an exposed neck extension and the sealing means comprising a screw plug carried by said neck.

3. A pressure transmission connection for apparatus of the character disclosed comprising a long tube of small diameter to confine a fine column between remotely related instrumentalities and an evacuated envelope sealed in spaced relation about said tube for protecting the confined column against intervening temperature conditions between the instrumentalities which otherwise might affect the action of said column.

4. A pressure transmission connection for apparatus of the character disclosed comprising a long tube of small diameter to confine a fine column between remotely related instrumentalities and an evacuated envelope sealed in spaced relation about said tube for protecting the confined column against intervening temperature conditions between the instrumentalities which otherwise might affect the action of said column, said envelope including a large tube surrounding the pressure tube and thermal insulating material within the larger tube holding the smaller tube mechanically braced in spaced relation therein.

In witness whereof, I have hereunto set my hand this 11th day of March, 1926.

JOHN D. DURANT.